(12) United States Patent
Smith

(10) Patent No.: US 8,544,501 B2
(45) Date of Patent: Oct. 1, 2013

(54) INDEXING ARRANGEMENT

(75) Inventor: Leon Smith, La Lucia (ZA)

(73) Assignee: Tongaat Hulett Limited, Tongaat (ZA)

( * ) Notice: Subject to any disclaimer, the term of this patent is extended or adjusted under 35 U.S.C. 154(b) by 868 days.

(21) Appl. No.: 11/992,035

(22) PCT Filed: Sep. 15, 2006

(86) PCT No.: PCT/IB2006/002547
§ 371 (c)(1),
(2), (4) Date: Apr. 14, 2010

(87) PCT Pub. No.: WO2007/031857
PCT Pub. Date: Mar. 22, 2007

(65) Prior Publication Data
US 2010/0206412 A1     Aug. 19, 2010

(30) Foreign Application Priority Data
Sep. 16, 2005   (ZA) ................................. 2005/07481

(51) Int. Cl.
*F16K 11/02*     (2006.01)
(52) U.S. Cl.
USPC ................. 137/625.15; 137/597; 137/625.46; 137/625.12; 137/240
(58) Field of Classification Search
USPC .................. 137/597, 625.46, 625.15, 625.13, 137/625.12, 625.11, 240; 251/175
See application file for complete search history.

(56) References Cited

U.S. PATENT DOCUMENTS

| | | | | |
|---|---|---|---|---|
| 2,209,991 | A |   | 8/1940 | McGill |
| 2,996,083 | A | * | 8/1961 | Huska ...................... 137/625.11 |
| 3,186,434 | A | * | 6/1965 | Hrdina ..................... 137/625.11 |
| 4,223,700 | A | * | 9/1980 | Jones ............................. 137/874 |
| 4,253,494 | A | * | 3/1981 | Cooke ...................... 137/625.23 |
| 4,271,020 | A | * | 6/1981 | Van Meter .................... 210/133 |
| 4,372,337 | A | * | 2/1983 | Holzenberger ............... 137/240 |
| 4,467,701 | A | * | 8/1984 | Sigmon ....................... 92/103 M |
| 4,625,763 | A | * | 12/1986 | Schick et al. ............ 137/625.15 |
| 4,633,904 | A | * | 1/1987 | Schumann et al. ....... 137/625.15 |
| 4,951,702 | A | * | 8/1990 | Brotcke ........................ 137/218 |
| 5,188,151 | A | * | 2/1993 | Young et al. .................. 137/874 |
| 5,282,652 | A | * | 2/1994 | Werner ........................... 285/55 |
| 5,704,396 | A | * | 1/1998 | Brillant et al. ........... 137/625.15 |
| 5,806,552 | A | * | 9/1998 | Martin, Jr. .................... 137/270 |
| 5,979,483 | A | * | 11/1999 | Zapalac ..................... 137/15.01 |
| 6,146,119 | A | * | 11/2000 | Bush et al. ................... 418/55.4 |

(Continued)

FOREIGN PATENT DOCUMENTS

| | | | |
|---|---|---|---|
| EP | 0315302 A1 | 5/1989 | |
| WO | WO 2004/029490 A1 | 4/2004 | |

*Primary Examiner* — John Rivell
*Assistant Examiner* — Minh Le
(74) *Attorney, Agent, or Firm* — Kilpatrick Townsend & Stockton LLP

(57) ABSTRACT

An indexing arrangement (10) includes a rotor (12) ; a stator (14) spaced from the rotor; a rotary seal (16) located between the rotor and the stator, with the seal being rotatable with the rotor; means for urging the rotary seal into sealing contact with the stator; ports (20, 24, 22) in the rotor, in the stator and in the rotary seal; and connecting means (26) for connecting respective ports (20) in the rotor with respective ports in the rotary seal; so that in use fluid can flow through the ports in the rotor, into the ports in the rotary seal via the connecting means, and out through the ports (24) in the stator.

12 Claims, 5 Drawing Sheets

(56) References Cited

U.S. PATENT DOCUMENTS

| | | | |
|---|---|---|---|
| 7,191,797 B2* | 3/2007 | Jensen et al. | 137/580 |
| 7,343,933 B2* | 3/2008 | McBeth et al. | 137/625.11 |
| 7,544,293 B2* | 6/2009 | Oroskar et al. | 210/198.2 |
| 2004/0094216 A1* | 5/2004 | Wagner | 137/625.46 |
| 2005/0092377 A1* | 5/2005 | Mork et al. | 137/597 |
| 2007/0235091 A1* | 10/2007 | Granot | 137/597 |
| 2008/0093806 A1* | 4/2008 | Takahashi | 277/375 |
| 2008/0121293 A1* | 5/2008 | Leber et al. | 137/597 |
| 2009/0120520 A1* | 5/2009 | Weiss | 137/625.46 |

* cited by examiner

INDEXING ARRANGEMENT

CROSS-REFERENCE TO RELATED APPLICATIONS

This application is a National Stage of International Application No. PCT/IB2006/002547, filed Sep. 15, 2006, and which claims the benefit of South African Patent Application No. 2005/07481, filed Sep. 16, 2005, the disclosures of both applications being incorporated herein by reference.

FIELD OF THE INVENTION

This invention relates to an indexing arrangement.

BACKGROUND TO THE INVENTION

WO 2004/029490 describes a rotary distribution apparatus. This apparatus includes an indexing arrangement. It is an object of this invention to provide an improved indexing arrangement.

SUMMARY OF THE INVENTION

According to the invention an indexing arrangement includes:
a rotor,
a stator spaced from the rotor;
a rotary seal located between the rotor and the stator, with the seal being rotatable with the rotor;
means for urging the rotary seal into sealing contact with the stator;
ports in the rotor, in the stator and in the rotary seal; and
connecting means for connecting respective ports in the rotor with respective ports in the rotary seal;
so that in use fluid can flow through the ports in the rotor, into the ports in the rotary seal via the connecting means, and out through the ports in the stator.

The connecting means may be conduits located in the ports of the rotor and extending into the ports of the rotary seal.

Conduit seals for providing seals between the conduits and the rotary seal are preferably provided.

The conduit seals may be located within circumferentially extending grooves in the conduits.

The means for urging the rotary seal into sealing contact with the rotor may be a pressure chamber located between the rotor and the rotary seal.

The rotary seal may be annular.

The pressure chamber may have an outer pressure chamber seal on the outer circumference of the rotary seal, and an inner pressure chamber seal on the inner circumference of the rotary seal.

The outer pressure chamber seal may be located in a pressure chamber outer ring connected to the rotor, and the inner pressure chamber seal may be located in a pressure chamber inner ring connected to the rotor.

A flushing arrangement for flushing any fluid, which leaks out between the rotary seal and the stator, out of the indexing arrangement may be provided.

The flushing arrangement may include an inner flushing chamber adjacent in the inner circumference of the rotary seal, and an outer flushing chamber adjacent an outer circumference of the seal, with the inner and outer flushing chambers each having an inlet through which flushing fluid can be introduced, and each having a flushing fluid outlet through which the flushing fluid and leaked fluid can be flushed.

The inner flushing chamber may be located between the inner circumference of the rotary seal and an inner flushing chamber ring, and the outer flushing chamber may be located between the outer circumference of the rotary seal and an outer flushing chamber ring.

The inner flushing chamber may have a flushing fluid inlet located between the inner flushing chamber ring and the pressure chamber inner ring and the pressure chamber inner ring; and the outer flushing chamber may have a flushing fluid inlet located between the outer flushing chamber ring and the pressure chamber outer ring, the outer and the inner flushing chambers having flushing fluid outlets in the stator.

The rotor may include a ring gear located on the outer periphery of the rotor so that in use the ring gear can be rotated by a driving gear to rotate the rotor and the rotary seal.

A bearing is preferably interposed between the rotor and the stator.

DETAILED DESCRIPTION OF THE DRAWINGS

Figure 1:
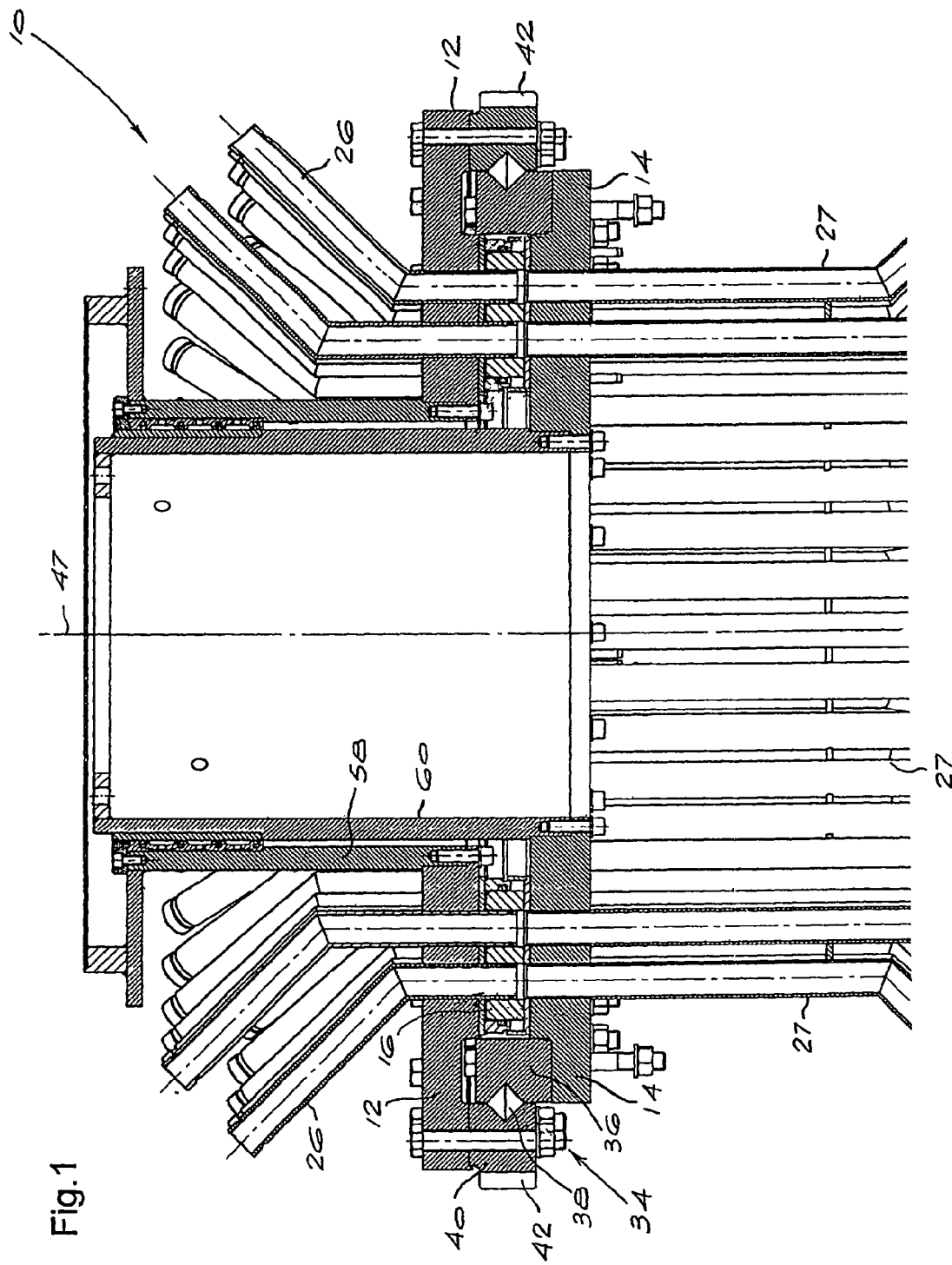
FIG. 1 is a cross-sectional side view of an indexing arrangement according to the invention.
Figure 2:
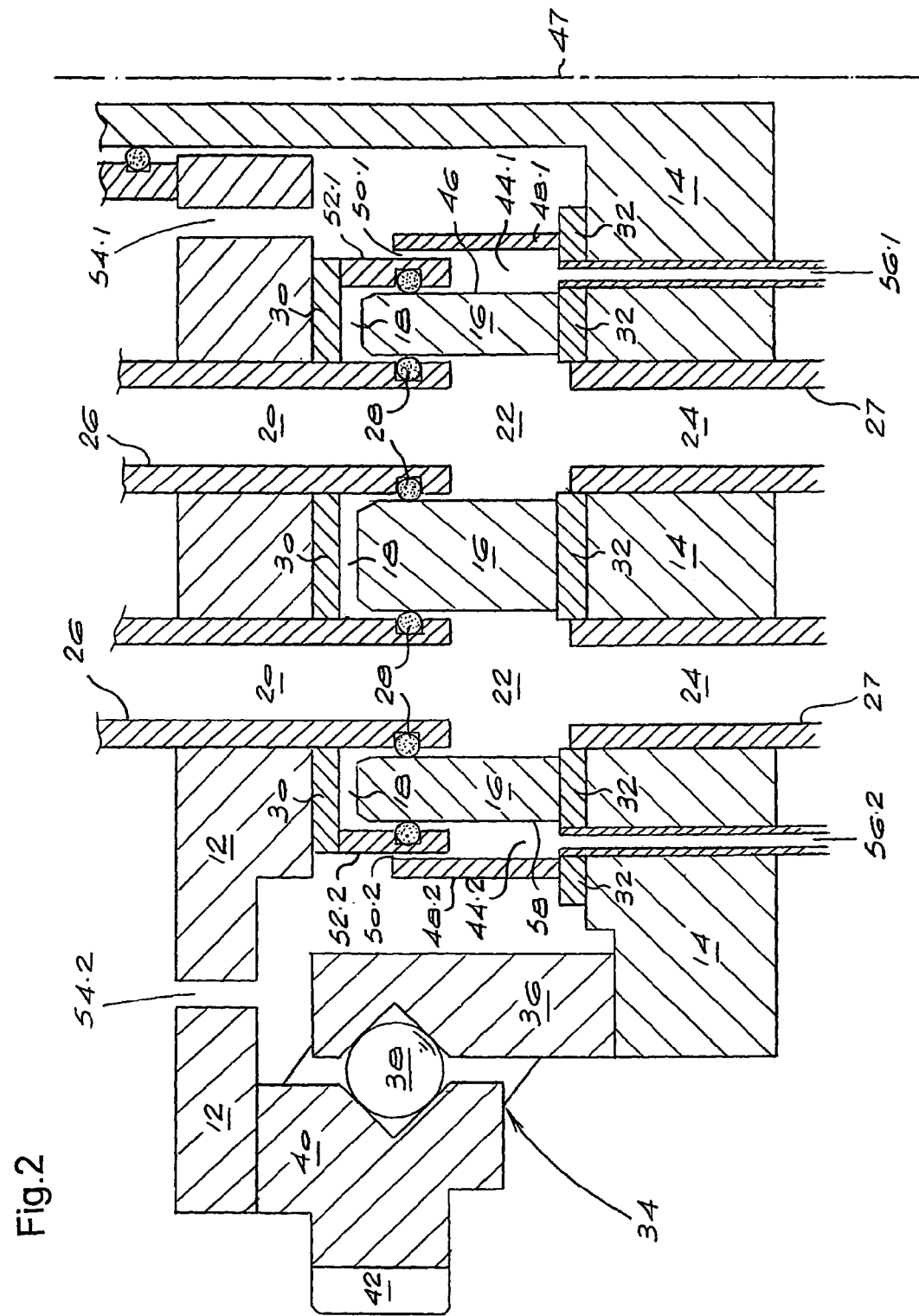
FIG. 2 is an enlarged diagrammatic view of part of the indexing arrangement of FIG. 1.
Figure 3:
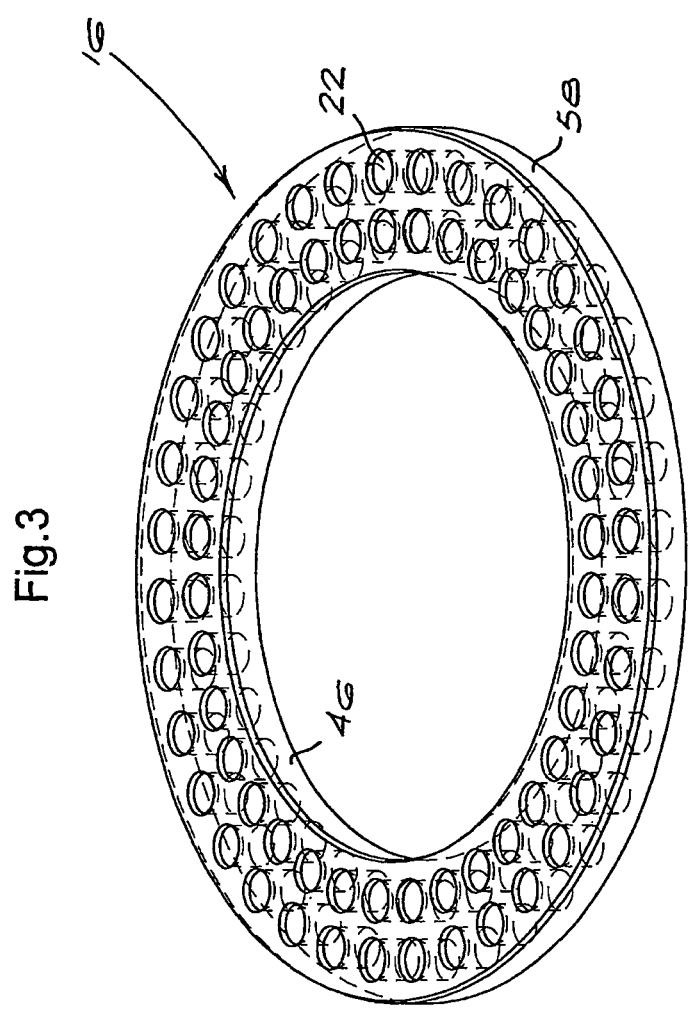
FIG. 3 is a perspective view of a rotary seal of the indexing arrangement of FIGS. 1 and 2.
Figure 4:
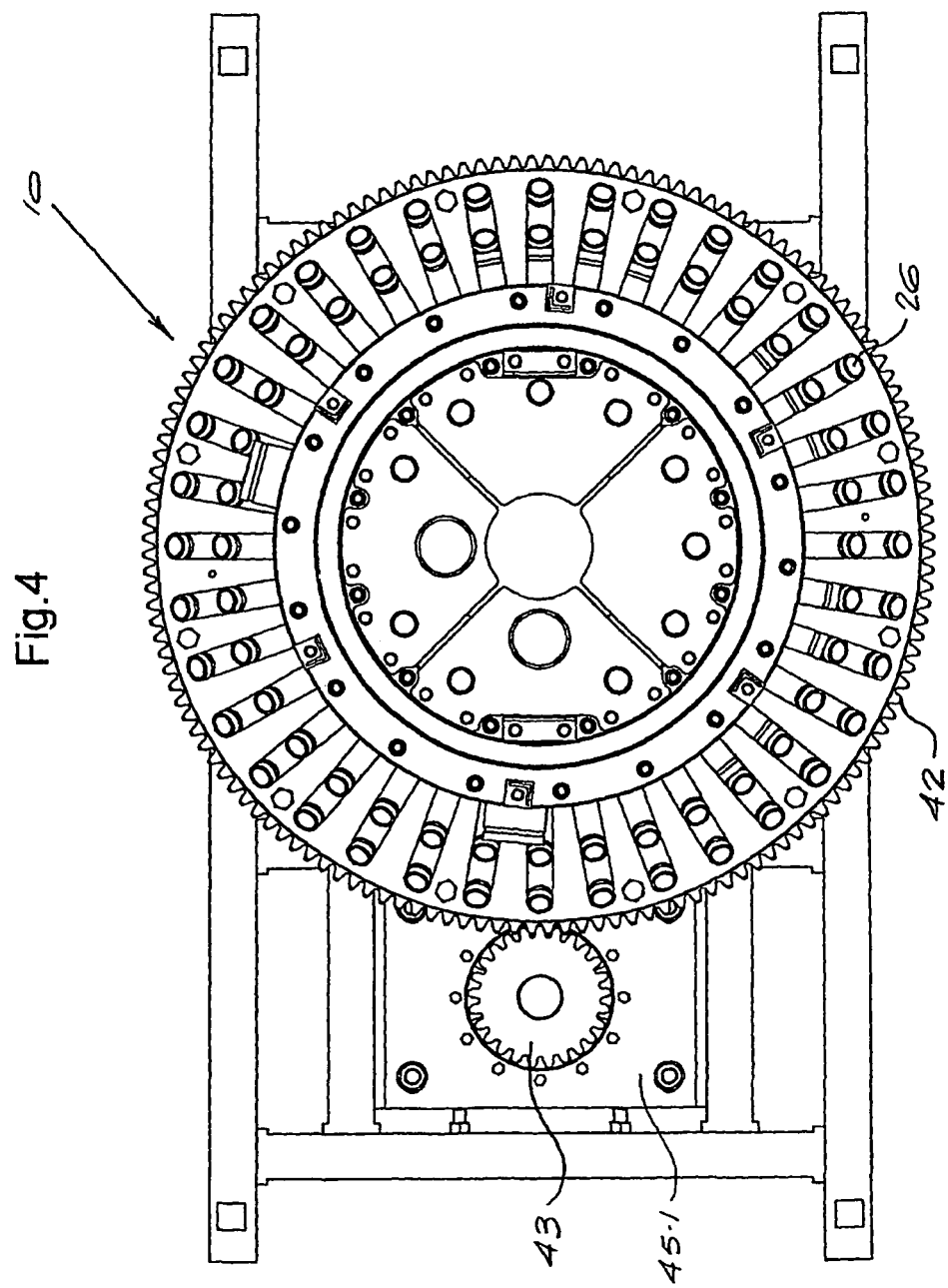
FIG. 4 is a plan view of the indexing arrangement.

An indexing arrangement 10 includes a rotor 12 spaced from a stator 14. A rotary seal 16 is located between the rotor 12 and the stator 14. A pressure chamber 18 is located between the rotor 12 and the rotary seal 16. Air under pressure is introduced into the pressure chamber 18 via an inlet (not shown).

The rotor 12, stator 14 and rotary seal 16 have ports 20, 22 and 24 respectively. Conduits 26 extend through the ports 20 and extend into the ports 22. Seals in the form of O-rings 28 provide seals between the conduits 26 and the rotary seal 16. Conduits 27 extend into the ports 24 of the stator 14.

The rotor 12 is made of mild steel and is lined with a liner 30. The liner 30 is made of a material known as Hastelloy. Likewise the stator 14 is made of mild steel and lined with highly polished liner 32 made of Hastelloy. The rotary seal 16 is made of polytetrafluoroethylene. It will however be appreciated that the materials from which the various components are made will depend on the nature of the fluid which flows through the indexing arrangement 10.

Figure 5:
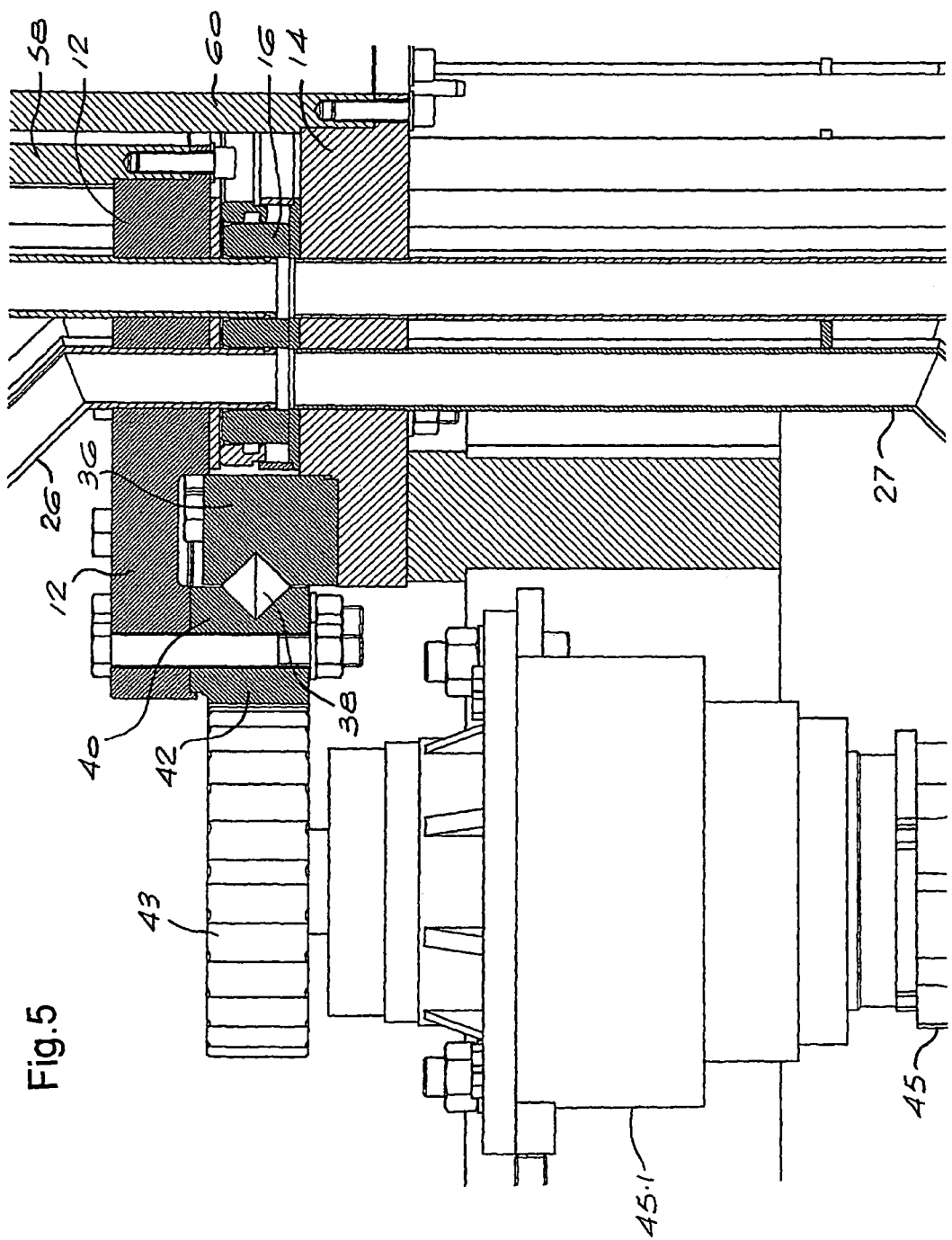
FIG. 5 is an enlarged side view of part of the indexing arrangement

A slew ring bearing 34 is interposed between the rotor 12 and the stator 14. The slew ring bearing 34 includes an inner race 36, ball bearings 38 and an outer race 40. A ring gear 42 is fixed to the outer race 40. The ring gear 42 is driven by a pinion gear 43 to rotate the rotor 12 and the rotary seal 16. The pinion gear 43 is driven by a motor 45 via a gearbox 45.1 (FIG. 5).

An inner flushing chamber 44.1 is provided between an inner circumference 46 of the rotary seal 16 and an inner flushing chamber ring 48.1. A flushing fluid inlet 50.1 extends between the inner flushing chamber ring 48.1 and an O-ring receiving pressure chamber inner ring 52.1. The rotor 12 has a flushing air inlet 54.1. The stator 14 has a flushing air and leaked liquid outlet 56.1.

An outer flushing chamber 44.2 is provided between an outer circumference 58 of the rotary seal 16 and an outer flushing chamber ring 48.2. A flushing fluid inlet chamber 50.2 extends between the outer flushing chamber ring 48.2 and an O-ring receiving pressure chamber outer ring 52.2. The rotor 12 has a flushing air inlet 54.2. The stator 14 has a flushing air and leaked liquid outlet 56.2.

The rotor 12 is secured to a rotor connector 58. The rotor connector 58 is in turn secured to a rotor of a distribution member (not shown). Likewise the stator 14 is fixed to a stator connector 60. The stator connector 60 is in turn secured to a stator of the distribution member.

In use, the rotor 12 is indexed or rotated by the pinion gear 43 about an axis of rotation 47 sequentially to align sets of ports 20 in the rotor 12 with sets of ports 24 in the stator 14. Pressurised air in the pressure chamber 18 forces the rotary seal 16 downwardly into sealing contact with the liner 32 of the stator 14. The rotary seal 16 can flex slightly to accommodate wear of the liner 32. The applicant believes that a floating seal with a one meter diameter will flex or deflect about one millimeter. The pressure of the air in the pressure chamber is between 600 to 1000 kPa, (6 to 10 bar) or 200 kPa (2 bar) above the highest fluid pressure.

Any liquid flowing through the ports 20, 22 and 24 which happens to leak between the seal formed between the rotary seal 16 and the rotor 14 to the outer or inner circumferences 58 and 48 of the rotary seal 16, is flushed out of the indexing arrangement 10 by flushing air. The flushing air flows through the rotor inlets 54.1 and 54.2, through the flushing chamber inlets 50.1 and 50.2, into the flushing chambers 44.1 and 44.2, and out with any entrained leaked liquid through the flushing outlets 56.1 and 56.2.

The applicant believes that leakage between ports, and thus product contamination, will at least be reduced in the indexing arrangement according to the invention.

It will be appreciated that many modifications or variations of the invention are possible without departing from the spirit or scope of the invention.

The invention claimed is:

1. An indexing arrangement including:
 a rotor;
 a stator spaced from the rotor;
 a rotary seal located between the rotor and the stator, with the seal being rotatable with the rotor;
 means for urging the rotary seal into sealing contact with the stator;
 ports in the rotor, in the stator and in the rotary seal; and
 connecting means for connecting respective ports in the rotor with respective ports in the rotary seal; and
 a flushing arrangement for flushing any fluid which leaks between the rotary seal and the stator out of the indexing arrangement, the flushing arrangement including an inner flushing chamber adjacent an inner circumference of the rotary seal and an outer flushing chamber adjacent an outer circumference of the seal, the inner and outer flushing chambers each having a flushing fluid inlet through which flushing fluid can be introduced and a flushing fluid outlet through which the flushing fluid and leaked fluid can be flushed,
 the arrangement being such that in use fluid can flow through the ports in the rotor, into the ports in the rotary seal via the connecting means, and out through the ports in the stator.

2. The arrangement of claim 1 wherein the connecting means are conduits located in the ports of the rotor and extending into the ports of the rotary seal.

3. The arrangement of claim 2 including conduit seals for providing seals between the conduits and the rotary seal.

4. The arrangement of claim 3 wherein the conduit seals are located within circumferentially extending grooves in the conduits.

5. The arrangement of claim 1 wherein the means for urging the rotary seal into sealing contact with the stator is a pressure chamber located between the rotor and the rotary seal.

6. The arrangement of claim 1 wherein the rotary seal is annular.

7. The arrangement of claim 5 wherein the pressure chamber has an outer pressure chamber seal on the outer circumference of the rotary seal, and an inner pressure chamber seal on the inner circumference of the rotary seal.

8. The arrangement of claim 7 wherein the outer pressure chamber seal is located in a pressure chamber outer ring connected to the rotor, and wherein the inner pressure chamber seal is located in a pressure chamber inner ring connected to the rotor.

9. The arrangement of claim 1 wherein the inner flushing chamber is located between the inner circumference of the rotary seal and an inner flushing chamber ring, and wherein the outer flushing chamber is located between the outer circumference of the rotary seal and an outer flushing chamber ring.

10. The arrangement of claim 9, wherein the inner flushing chamber has a flushing fluid inlet located between the inner flushing chamber ring and a pressure chamber inner ring; and wherein the outer flushing chamber has a flushing fluid inlet located between the outer flushing chamber ring and a pressure chamber outer ring, the outer and the inner flushing chambers having flushing fluid outlets in the stator.

11. The arrangement of claim 1 wherein the rotor includes a ring gear located on the outer periphery of the rotor so that in use the ring gear can be rotated by a driving gear to rotate the rotor and the rotary seal.

12. The arrangement of claim 11 including a bearing interposed between the rotor and the stator.

* * * * *